(12) United States Patent
Wilkinson

(10) Patent No.: US 7,865,881 B2
(45) Date of Patent: Jan. 4, 2011

(54) VALIDATING FUNCTION CALLS IN SOURCE CODE

(75) Inventor: Andrew Wilkinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 11/553,118

(22) Filed: Oct. 26, 2006

(65) Prior Publication Data

US 2008/0104580 A1 May 1, 2008

(30) Foreign Application Priority Data

Oct. 26, 2006 (GB) .................................. 0521792.2

(51) Int. Cl.
*G06F 9/44* (2006.01)
(52) U.S. Cl. .................... 717/126; 717/124; 717/127
(58) Field of Classification Search .................. 717/126
See application file for complete search history.

(56) References Cited

U.S. PATENT DOCUMENTS

| | | | |
|---|---|---|---|
| 5,664,206 A | 9/1997 | Murow et al. | |
| 5,678,039 A | 10/1997 | Hinks et al. | |
| 5,982,893 A * | 11/1999 | Hughes | 705/75 |
| 6,149,318 A * | 11/2000 | Chase et al. | 717/131 |
| 6,286,130 B1 * | 9/2001 | Poulsen et al. | 717/119 |
| 7,017,157 B1 * | 3/2006 | Ishioka | 718/102 |
| 7,086,044 B2 * | 8/2006 | Hanson et al. | 717/151 |
| 7,328,428 B2 * | 2/2008 | Baugher | 717/124 |
| 7,398,513 B2 * | 7/2008 | Joshi | 717/124 |
| 2002/0107684 A1 | 8/2002 | Gao | |
| 2004/0225921 A1 * | 11/2004 | Joshi | 714/38 |

FOREIGN PATENT DOCUMENTS

EP          1315086          5/2003

* cited by examiner

*Primary Examiner*—Thomas K Pham
(74) *Attorney, Agent, or Firm*—Marcia L. Doubet

(57) ABSTRACT

There is disclosed a method, apparatus and computer program for validating a function call in source code, a valid function call referencing a message in a message bundle using a message key specified in the function call, the valid function call operable to produce output using the referenced message. First a function call to validate is located. Then it is determined whether a message bundle associated with a message key specified in the function call can be located. Responsive to this being possible, an attempt is made to access the referenced message within the message bundle using the message key. An error message is output should validation of the function call fail.

36 Claims, 4 Drawing Sheets

VALIDATING FUNCTION CALLS IN SOURCE CODE

FIELD OF THE INVENTION

The present invention relates to software testing.

BACKGROUND OF THE INVENTION

In today's global market it is increasingly important for any human-readable output created by computer software to be internationalised. A common mechanism used to achieve internationalisation is the use of message bundles. Rather than hard coding the human-readable text a key is provided instead and this key is then used to look up the message in the associated bundle. By providing different message bundles for different languages the software becomes internationalised without the source code itself containing any text that is specific to a particular language. In addition to using a key to lookup a message, a typical message bundle implementation will allow additional parameters to be provided that are then substituted into the message at defined points.

European Patent 1315086 describes a method and processing unit for providing localised versions of a software application allowing maintenance of a single code version. Text elements may be centrally maintained and handled in a text element file, while the code may only include references to the individual text elements at specified locations.

A major problem with current message bundle implementations is that they are entirely reliant on the software developer specifying a message bundle correctly, specifying a key that exists in the message bundle, as well as the correct number of parameters to be substituted into the message. Should the developer get this wrong the end-user may be presented with an obscure error code rather than the intended concise description of the solution to the problem they are experiencing. This inevitably leads to a marked decrease in customer satisfaction and an increased number of calls being made to customer support, There are a number of known solutions to the problem of ensuring that software source code conforms to sets of configurable rules many of which have been productised such as Parasoft's JTest and IBM's Rational Application Developer 6.0. However, these existing solutions are unable to cope with the inherent complexity of validating code that is internationalised through the use of message bundles—they are not capable of identifying the relationship between a method call and the message bundle from which it will extract its internationalised text.

SUMMARY OF THE INVENTION

According to a first aspect, there is provided a method for validating a function call in source code, a valid function call referencing a message in a message bundle using a message key specified in the function call, the valid function call operable to produce output using the referenced message, the method comprising: locating a function call to validate; determining whether a message bundle associated with a message key specified in the function call can be located; responsive to locating the message bundle, attempting to access the referenced message within the message bundle using the message key; and outputting an error message should validation of the function call fail.

Preferably, to determine whether the message bundle can be located, the style of API being used to produce the output is determined. Preferably, it can then be determined where a component for producing the output is initialised. If it is determined that the component is initialised separately from the source code, then it is preferably identified where the initialisation took place (e.g. in another source code file). It is then preferably possible to attempt to load the source code in which the component being used to produce the output is initialised.

To identify where the initialisation took place (e.g. either in the source code itself or separately), the source code may be examined to determine how the component is referenced and such information can then be used to determine in which source code file initialisation took place. For example, the component may simply be referenced by a shortname that is then qualified by a source code "import" statement. Alternatively there may be no relevant "import" statements and associated files may instead have to be searched for the component (e.g. those in the same package).

In a preferred embodiment, the name of the message bundle is determined based on knowledge of the style of API. E.g. configuration information may indicate that the name of the message bundle is always provided to a component using a particular style of API as the second parameter, If the name of the message bundle is provided as a string, then an attempt is preferably made to access the message bundle using this string.

If, on the other hand, the name of the message bundle is provided as a reference to a variable, then the name of a field being accessed and from where that field is accessed (e.g. the class) is preferably determined. An attempt is then made to load the source code in which the component is initialised. Once the source code has been loaded, the name of the message bundle is then preferably determined and an attempt is then made to access the message bundle.

If it is not possible to load the source code in which the component is initialised, then the binary version of the source code in which the component is initialised is preferably loaded. If the name of the message bundle is provided as a static value, then the message bundle name can preferably be retrieved. If the name is provided dynamically, then the binary version is preferably executed to retrieve the name of the message bundle.

In a preferred embodiment, once a referenced message has been accessed, then any source code provided inserts for the message are validated.

In accordance with a preferred embodiment, to validate any source code provided inserts for the message, it is determined if there is a mismatch between the number of inserts provided and the number of inserts required by the referenced message.

Preferably each provided insert and required insert has an associated type and this is used to determine whether the provided insert type and the required insert type match.

Preferably the message has meta-data associated therewith detailing the type of each required insert.

According to a second aspect, there is provided an apparatus for validating a function cast in source code, a valid function call referencing a message in a message bundle using a message key specified in the function call, the valid function call operable to produce output using the referenced message, the apparatus comprising: means for locating a function call to validate, means for determining whether a message bundle associated with a message key specified in the function call can be located; means, responsive to locating the message bundle, for attempting to access the referenced message within the message bundle using the message key; and means for outputting an error message should validation of the function call fail.

According to a third aspect, there is provided a computer program for validating a function call in source code, a valid function call referencing a message in a message bundle using a message key specified in the function call, the valid function call operable to produce output using the referenced message, the computer program comprising program code means adapted to perform the following method when the program is run on a computer: locating a function call to validate; determining whether a message bundle associated with a message key specified in the function call can be located responsive to locating the message bundle, attempting to access the referenced message within the message bundle using the message key; and outputting an error message should validation of the function call fail.

BRIEF DESCRIPTION OF THE DRAWINGS

A preferred embodiment of the present invention will now be described, by way of example only, and with reference to the following drawings.

DETAILED DESCRIPTION

Disclosed is a mechanism by which any message bundle keys contained in a product's source code can be automatically validated to ensure that they correctly map to a message in an associated message bundle and, if so, that the correct number of parameters has been supplied for that message.

The feature that underpins this mechanism is its ability to understand the relationship between code that supplies message bundle keys and parameters, and the message bundle itself. This relationship is not straightforward as the identity of the message bundle that is used by a particular call may not be defined locally—in some cases the message bundle's identity Is specified in an entirely separate source file. This will be addressed in more detail later.

Figure 1A:
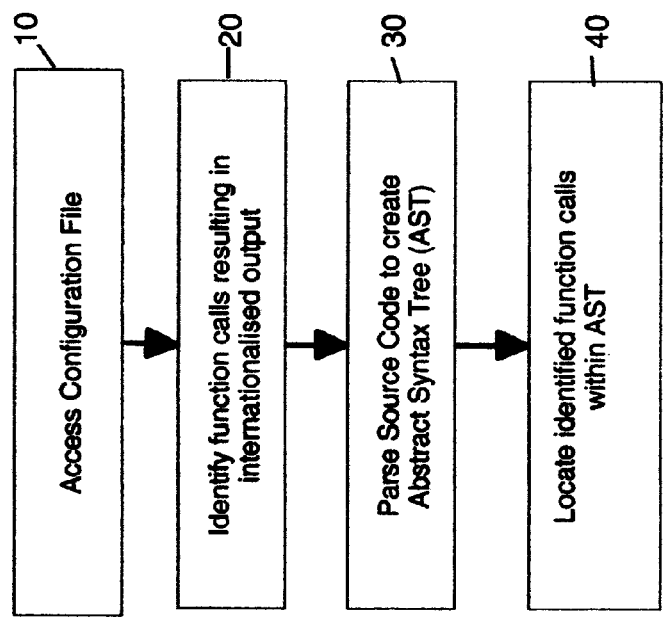
FIGS. 1a, 1b and 1c illustrate the processing of a preferred embodiment of the present invention.
Figure 1B:
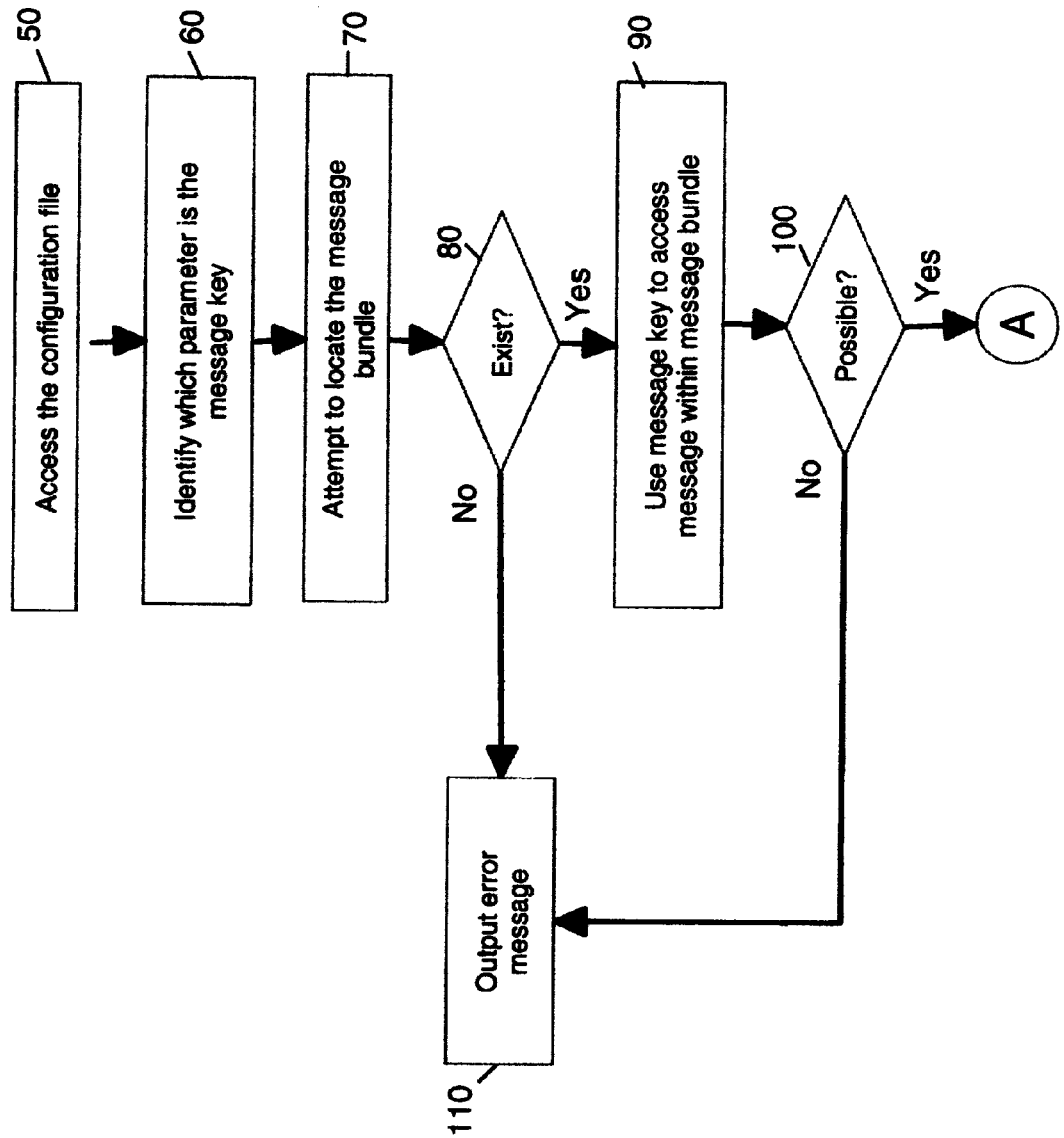
Figure 1C:
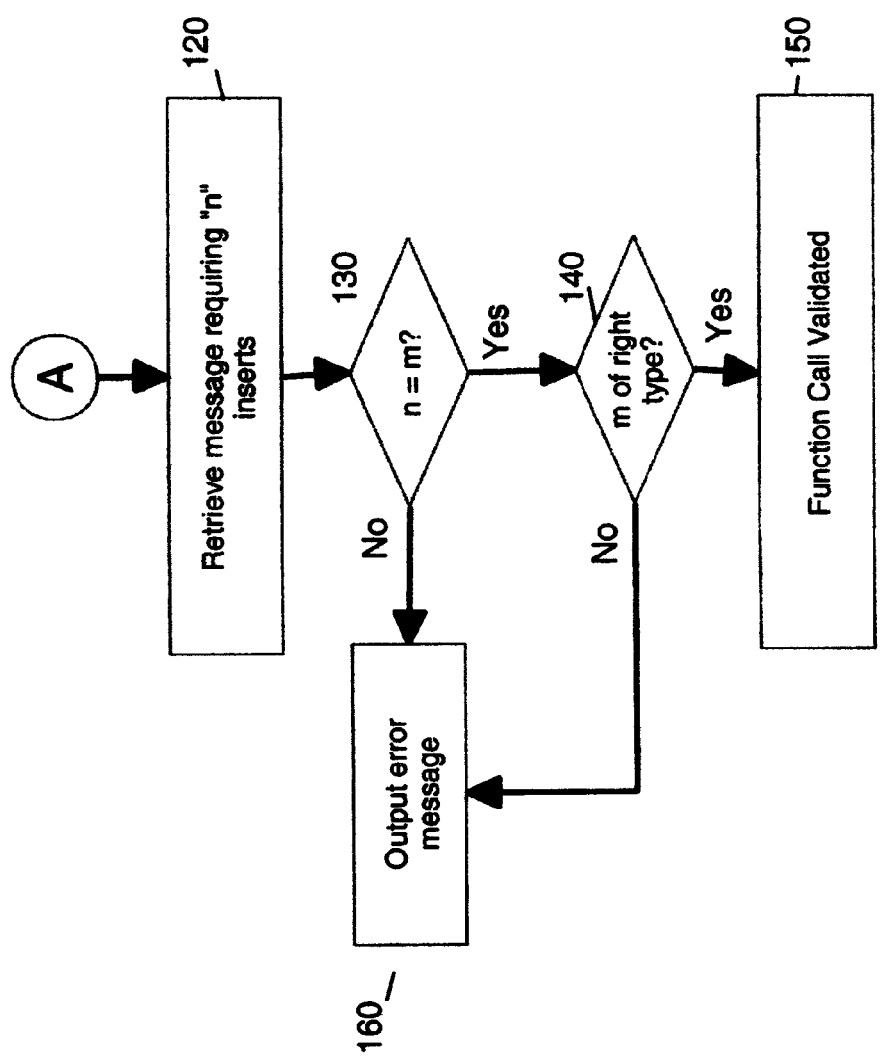
Figure 2:
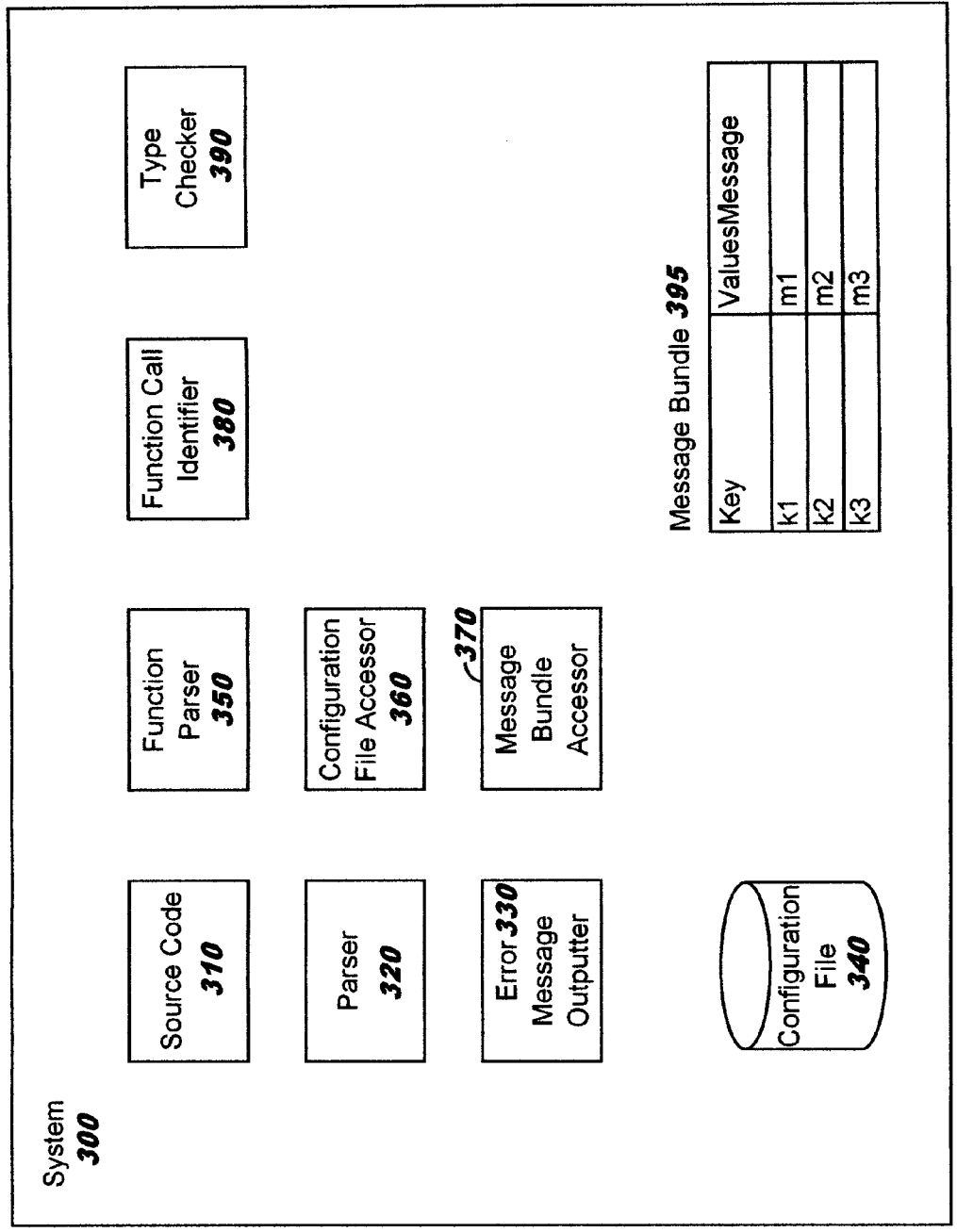
FIG. 2 depicts the componentry of a preferred embodiment of the present invention.

FIGS. 1a, 1b and 1c illustrate the processing of the present invention in accordance with a preferred embodiment. FIG. 2 depicts the componentry of the present invention in accordance with a preferred embodiment. The figures should be read in conjunction with one another.

Some source code 310 contains a number of function calls, each of which should result in the output of an internationalised message (e.g. an error message). The invention, in accordance with a preferred embodiment, provides a mechanism for testing that such function calls do indeed produce the intended output.

Thus at step 10, a configuration file 340 is accessed (configuration file accessor 360)to identify those function calls that need to link to a message bundle 395 so as to return and output an appropriate message. Such functions may, by way of example, be tracing functions—e.g. "trace.warning"; "trace.error"; "trace.info"; "trace.audit"; and "trace.severe".

At step 20, the list of functions are identified (function call identifier 380). The source code is then parsed into an Abstract Syntax Tree (AST) by parser component 320 (step 30) to locate any of the identified function calls within the code (step 40).

For each identified function call, the following processing of FIGS. 1b and 1c is performed.

At step 50, the configuration file 340 is accessed again (configuration file accessor 360) and is used to determine which parameter within the source code is the message key (step 60). For example, the configuration file may indicate that for the trace.warning call, the message key is the second parameter.

At step 70, an attempt is made to locate the relevant message bundle (message bundle accessor 370).

The processing to achieve this is described below:

1. Firstly the source code generating the output is analysed to determine which style of API has been used; either one that invokes a method on the "config object" or tracing component (e.g. tc.warning("key"), where "tc" is the trace component and "warning" is the method) or one that provides the config object as a parameter (e.g. logger.warning(tc, "key") where "logger" is a separate logging API, "warning" is the method and tc is passed as a parameter to the logger API and used to reference the tracing component). Information about the style of API and what this means may be provided as configuration information. The style of API becomes important later.

2. It is then determined where the config object's initialisation took place. The AST can be interrogated to determine this. This will either be within the same compilation unit ("class" in object oriented terminology) and therefore AST or in a separate one. If it's in the same AST, then both the following steps a and b can be omitted. Otherwise the tracing component is located in a separate source file so that it may be referenced easily by multiple source code files. The following steps must therefore be performed, a) Identify in which class the initialisation took place. This is achieved by looking at how the config object is referenced. Note, this may involve looking at which package the class is in and what imports it has. Such imports may specify the fully qualified reference for the tracing component (i.e. where to find the tracing component). If the imports do not help, then other files within the package can be searched (see step b).

b) Attempt to locate the source code for the class. For example, this could be done by looking in both the project that contains the calling class and any projects on which it depends. If the source code is found an AST is created for it and the initialisation statement is located, it is then possible to proceed to 3. If the source code cannot be found, it would be possible to look for a compiled version of the code and use reflection to attempt to determine the path for the message bundle although this would require an intimate knowledge of the config object's structure and its fields.

3) Using an understanding of the API that's used to initialise the config object and the AST, the path for the message bundle can be derived from the code that performs the config object's. e.g. in the java.util.logging case it's the second parameter passed to the getLogger( ) call. If this value is provided as a String then, it is possible to skip straight to 4). If it's provided as a reference to a variable (e.g. something like RASConstants. MESSAGE_BUNDLE), things are a little more complicated:

The process required to determine MESSAGE_BUNDLE's value is very similar to that described in 2a, and 2b however the use of reflection is far more viable:

a) Determine the name of the field that's being accessed and the class to which it belongs;

b) Attempt to load the source for the class—if the source can be found, then an AST is created and used to obtain the constant's value. If this is not possible:

1) Load the binary version of the class (this must be available otherwise the code wouldn't compile).

2) If the field is static, retrieve its value directly. If the field is not static load an instance of the class and retrieve the field's value.

4) Thus, the path for the message bundle is now available and needs to be loaded. A classloader is created that references both the project that contains the class and any projects on which it depends. Using this classloader the message bundle is loaded and the validation of the key and any inserts can be performed.

Thus, as indicated above, an understanding of the API in question is used to locate the appropriate message bundle. For example, In the case of the java.util.logging API, the message bundle is supplied as a parameter when the Logger object is being created:

```
public class Foo
{
    private static final Logger logger =
Logger.getLogger(Foo.class.getName( ), "MyMessageBundle");
    public void bar( )
    {
        logger.info("ABC100", "yellow");
    }
}
```

In this case, the message bundle accessor knows that, as an instance named logger is being used to output the translated message, it must look to where it was initialised to determine the name of the message bundle that is to be used.

By way of another example, an alternative API may specify the message bundle on a call to a factory that creates the object used to output internationalised messages as illustrated in the following code snippet:

```
public class Foo
{
    private static final TraceComponent tc = Trace.register(Foo.class,
"MyMessageBundle");
    public void bar( )
    {
        Trace.info(tc, "ABC100", "yellow");
    }
}
```

The message bundle accessor knows that, as tc is being used in the info call, it must took to where tc was initialised to determine the name of its message bundle. Having determined the message bundle's name, it can then, given an understanding of the code's classpath, load the bundle and check that there is a message in the bundle for the key ABC100 that takes a single parameter.

Note, in spite of all of the above, it may not be possible to locate the message bundle—it may not exist (step 80). In which case an error message is output (step 110).

If however the message bundle can be located, the message bundle accessor component 370 attempts to access the relevant message using the message key (step 90). At step 100, a test is performed to determine whether the requested message key exists. If no such key exists, then an appropriate error message is output at step 110 (error message outputter 330).

If on the other hand, the message key is a valid one, then the message bundle accessor 370 retrieves a message requiring "n" inserts (step 120). For example, the message might be "An error has occurred in function {0} on {1} {2} of {3}". With such a message, four inserts are sought. The number of inserts required can be determined from the referenced message itself.

A test is performed at step 130 to determine whether the number of inserts provided as part of the source code function call "m" matches the required number of inserts "n". The configuration file is used to determine which of the parameters provided by the function call are to be classed as "inserts". For example, one should be the message key (as described above) and so this parameter is not classed as an insert.

If the answer is no, then an informative error message is output by the error message outputter component 330 (step 160).

If the correct number of inserts are provided in the source code, then it is determined whether the provided inserts (m) are of the right type (step 140). Each provided insert will have an associated type (e.g. char, nt, float, or a newly defined type) and each message preferably has meta data associated therewith that denotes a type for each required insert. For example, a retrieved message may be "An error has occurred in function {0: function_name} on {1: day} {2: number} of {3: month}." In this example "function_name"; "day"; "number"; and "month" is the type information. Each type has a type definition that is preferably defined in a type database (not shown). For example, type name="function_name" which is a char(8); type name="day" which may be any one of "Monday", "Tuesday", "Wednesday", "Thursday", "Friday", "Saturday", "Sunday" etc.

Type checking is performed by type checker component 390. If there are any inconsistencies, then an informative error message is output (step 160).

If on the other hand, the provided insert types match the expected insert types, then the function call is validated (step 150) and processing moves to identify and validate the next function call in the abstract syntax tree.

A typical implementation of the invention would be as an extension to an integrated development environment (IDE) as a plugin. The implementation would typically provide a number of default relationships for the various logging APIs that are commonly used, allowing the user to quickly and easily configure it for use in their development project.

Whilst the invention has been described in terms of the use of message bundles in the process of internationlising software, the invention is not limited to such. The invention is applicable to the validation of any software using message bundles in other ways.

Further, whilst the location of a message bundle has been described in terms of object oriented technology, no limitation is intended. It is equally possible in the procedural programming environment.

The invention claimed is:

1. A method for validating a function call in source code, a valid function call referencing a message in a message bundle using a message key specified in the function call, the valid function call operable to produce output using the referenced message, the method comprising:

locating a function call to validate;

determining whether a message bundle associated with a message key specified in the function call can be located, and responsive to not locating the message bundle associated with the message key, concluding that the validation of the function call fails;

responsive to locating the message bundle, attempting to access the referenced message within the message bundle using the message key, and responsive to not accessing the referenced message within the message bundle using the message key, concluding that the validation of the function call fails; and outputting an error message should the validation of the function call fail.

2. The method of claim 1, wherein determining whether the message bundle can be located comprises:

determining a style of application programming interface (API) being used to produce the output.

3. The method of claim 2 comprising:

responsive to determining the style of API, determining where a component for producing the output is initialised.

4. The method of claim 3 comprising:

responsive to determining that the component is initialised separately from the source code, identifying where the initialisation took place; and attempting to load the source code in which the component being used to produce the output is initialised.

5. The method of claim 4, wherein identifying where the initialisation took place comprises:

looking at how the component is referenced; and using such information to determine in which source code file initialisation took place.

6. The method of claim 2, comprising:

determining based on knowledge of the style of API, a name of the message bundle.

7. The method of claim 6 comprising:

responsive to determining that the name of the message bundle is provided as a string, attempting to access the message bundle using the string.

8. The method of claim 6 comprising:

responsive to determining that the name of the message bundle is provided as reference to a variable, determining a name of a field being accessed and from where that field is accessed;

attempting to load the source code in which the component is initialised;

responsive to loading the source code, determining the name of the message bundle; and attempting to access the message bundle using the determined name.

9. The method of claim 8 comprising:

responsive to being unable to load the source code in which the component is initialised, loading a binary version of the source code in which the component is initialised;

responsive to the name of the message bundle being provided as a static value, retrieving the message bundle name from the static value;

responsive to the name of the message bundle being provided dynamically, executing the binary version to retrieve the name of the message bundle; and attempting to access the message bundle using the retrieved message bundle name.

10. The method of claim 1 comprising:

responsive to being able to access the referenced message, validating any source code provided inserts for the message.

11. The method of claim 10, wherein validating any source code provided inserts for the message comprises:

concluding that the validation of the function call fails when there is a mismatch between a number of inserts provided and a number of inserts required by the referenced message.

12. The method of claim 10 or 11, wherein each provided insert and required insert has an associated type, and wherein validating any source code provided inserts for the message comprises:

concluding that the validation of the function call fails when the provided insert type and the required insert type for any of the provided source code inserts does not match.

13. The method of claim 12, wherein the message has meta-data associated therewith detailing the type of each required insert.

14. Apparatus for validating a function call in source code, a valid function call referencing a message in a message bundle using a message key specified in the function call, the valid function call operable to produce output using the referenced message, the apparatus comprising:

a function call identifier for locating a function call to validate;

a message bundle locator for determining whether a message bundle associated with a message key specified in the function call can be located, and responsive to not locating the message bundle associated with the message key, concluding that the validation of the function call fails;

a message bundle accessor for, responsive to locating the message bundle, attempting to access the referenced message within the message bundle using the message key, and responsive to not accessing the referenced message within the message bundle using the message key, concluding that the validation of the function call fails; and an error message outputter for outputting an error message should the validation of the function call fail.

15. The apparatus of claim 14, wherein the message bundle locator comprises:

a style determiner for determining a style of application programming interface (API) being used to produce the output.

16. The apparatus of claim 15, comprising:

a component determiner for, responsive to determining the style of API, determining where a component for producing the output is initialised.

17. The apparatus of claim 16, comprising:

an identifier for, responsive to determining that the component is initialised separately from the source code, identifying where the initialisation took place; and a loader for attempting to load the source code in which the component being used to produce the output is initialised.

18. The apparatus of claim 17, wherein the identifier comprises:

a reference determiner for looking at how the component is referenced; and a source code determiner for using such information to determine in which source code file initialisation took place.

19. The apparatus of claim 15, comprising:

a name determiner for determining based on knowledge of the style of API, a name of the message bundle.

20. The apparatus of claim 19, the message bundle accessor comprising:

a string accessor for, responsive to determining that the name of the message bundle is provided as a string, attempting to access the message bundle using the string.

21. The apparatus of claim 19, comprising:

a field determiner for, responsive to determining that the name of the message bundle is provided as reference to a variable, determining a name of a field being accessed and from where that field is accessed;

a loader for attempting to load the source code in which the component is initialised;

a loaded source code name determiner, responsive to loading the source code, determining the name of the message bundle; and responsive to determining the name of the message bundle, the message bundle accessor attempting to access the message bundle using the determined name.

22. The apparatus of claim 21, comprising:

a binary version loader for, responsive to being unable to load the source code in which the component is initialised, loading a binary version of the source code in which the component is initialised;

a name retriever for, responsive to the name of the message bundle being provided as a static value, retrieving the message bundle name from the static value;

an executer for, responsive to the name of the message bundle being provided dynamically, executing the binary version to retrieve the name of the message bundle; and responsive to retrieving the name of the message bundle, the message bundle accessor attempting to access the message bundle using the retrieved message bundle name.

23. The apparatus of claim 14, comprising:

a validator for, responsive to being able to access the referenced message, validating any source code provided inserts for the message.

24. The apparatus of claim 23, wherein the validator comprises:

a failure determiner for concluding that the validation of the function call fails when there is a mismatch between a number of inserts provided and a number of inserts required by the referenced message.

25. The apparatus of claim 23 or 24, wherein each provided insert and required insert has an associated type, and wherein the validator comprises:

a failure determiner for concluding that the validation of the function call fails when the provided insert type and the required insert type for any of the provided source code inserts does not match.

26. The apparatus of claim 25, wherein the message has meta-data associated therewith detailing the type of each required insert.

27. A tangible storage medium containing computer readable program code, which when executed by a computer controls the computer to validate a function call in source code, a valid function call referencing a message in a message bundle using a message key specified in the function call, the valid function call operable to produce output using the referenced message, comprising computer readable program code for:

locating a function call to validate;

determining whether a message bundle associated with a message key specified in the function call can be located, and responsive to not locating the message bundle associated with the message key, concluding that the validation of the function call fails;

responsive to locating the message bundle, attempting to access the referenced message within the message bundle using the message key, and responsive to not accessing the referenced message within the message bundle using the message key, concluding that the validation of the function call fails; and outputting an error message should the validation of the function call fail.

28. The storage medium of claim 27, wherein determining whether the message bundle can be located comprises:

determining a style of application programming interface (API) being used to produce the output.

29. The storage medium of claim 28 further comprising program code for:

responsive to determining the style of API, determining where a component for producing the output is initialised.

30. The storage medium of claim 29 further comprising program code for:

responsive to determining that the component is initialised separately from the source code, identifying where the initialisation took place; and attempting to load the source code in which the component being used to produce the output is initialised.

31. The storage medium of claim 30 wherein identifying where the initialisation took place further comprises:

looking at how the component is referenced; and using such information to determine in which source code file initialisation took place.

32. The storage medium of claim 28, further comprising program code for:

determining based on knowledge of the style of API, a name of the message bundle.

33. The storage medium of claim 32 further comprising program code for:

responsive to determining that the name of the message bundle is provided as a string, attempting to access the message bundle using the string.

34. The storage medium of claim 32 further comprising program code for:

responsive to determining that the name of the message bundle is provided as reference to a variable, determining a name of a field being accessed and from where that field is accessed;

attempting to load the source code in which the component is initialised;

responsive to loading the source code, determining the name of the message bundle; and attempting to access the message bundle using the determined name.

35. The storage medium of claim 34 further comprising program code for:

responsive to being unable to load the source code in which the component is initialised, loading a binary version of the source code in which the component is initialised;

responsive to the name of the message bundle being provided as a static value, retrieving the message bundle name from the static value;

responsive to the name of the message bundle being provided dynamically, executing the binary version to retrieve the name of the message bundle; and attempting to access the message bundle using the retrieved message bundle name.

36. The storage medium of claim 27 further comprising program code for:

responsive to being able to access the referenced message, validating any source code provided inserts for the message.

* * * * *